United States Patent [19]
Chien

[11] Patent Number: 5,271,528
[45] Date of Patent: Dec. 21, 1993

[54] AUTOMATIC GREASE DISPENSER

[75] Inventor: Hui-Mei Chien, Taoyuan, Taiwan

[73] Assignee: Hornche Trading Co., Ltd., Taoyuan Hsien, Taiwan

[21] Appl. No.: 960,833

[22] Filed: Oct. 14, 1992

[51] Int. Cl.⁵ .............................. B67D 5/08
[52] U.S. Cl. ........................ 222/63; 222/95; 222/105; 222/326; 222/333; 222/390; 184/5.1; 184/38.4
[58] Field of Search .............. 222/95, 105, 103, 63, 222/181, 183, 185, 154, 159, 326, 333, 386.5, 390, 642; 184/26, 5.1, 38.4

[56] References Cited
U.S. PATENT DOCUMENTS

| | | | |
|---|---|---|---|
| 1,269,159 | 6/1918 | Copeman | 184/38.4 |
| 3,904,083 | 9/1975 | Little | 222/326 |
| 4,886,189 | 12/1989 | Vandegast | 222/333 |
| 5,139,169 | 8/1992 | Boyer | 222/103 |

Primary Examiner—Andres Kashnikow
Assistant Examiner—Philippe Derakshani
Attorney, Agent, or Firm—Bacon & Thomas

[57] ABSTRACT

An automatic grease dispenser using a motor to drive a rotary shaft via a reduction gear set for displacing a pusher downward to squeezing a grease out of a grease pack through an outlet in constant quantity at fixed intervals, and having a positioning element inserted to an longitudinal groove on a piston rod of the pusher to permit only vertical movement but prevent from rotation of the pusher following rotation of the rotary shaft.

2 Claims, 8 Drawing Sheets

AUTOMATIC GREASE DISPENSER

BACKGROUND OF THE INVENTION

The present invention relates to an automatic dispenser for industrial equipment, particularly a device having an improved structure to eliminate defects of the conventional grease dispenser.

Conventionally, manual grease gun, or electric or pneumatic oiler is used to inject grease into lubricating points. Though grease requirement of each bearing at each lubricating point can be obtained by calculation, such conventional greasing means can't control volume of grease injected precisely, and hence it is not possible to estimate proper greasing intervals. Therefore, greasing is usually done according to maintenance workers' experience, grease is usually overfilled for open type lubricating point, and it is not possible to determined whether greasing is enough or not in close type lubricating point. Excessive greasing would result in poor heat dissipation at bearing, and insufficient greasing would cause abnormal high temperature due to insufficient lubricating. All these are the main causes of bearing damage. Therefore, improper greasing would mean a waste of resource as well as manpower and even loss in productivity.

At the moment, the following grease cups are being used widely:

(1) Grease cup: It is available in the market is used for greasing widely. It is a grease container with a turnable cover. After placing of grease in the grease cup, turning of the cover manually can force grease to displace out of the cup. It is a tool to substitute grease gun, and the defects in the conventional grease gun remain unsolved.

(2) Spring type grease cup: It has a compression spring to force grease to displace out of the cup continuously for a considerable long time. The displacement of grease discontinued when the spring become loose. But a further compression of the spring can force the grease to displace out of the cup again. However, the defects in the conventional grease gun remain unsolved.

(3) Automatic grease cup: It has a compression spring acting on a piston to force grease to displace out of an outlet of a certain diameter to control output volume. The output volume can be further controlled by replacement of spring of different tension. However, as the spring is of linear compression type, its extension and displacement is a function of pressure, and the pressure varies upon change of compression, extension and displacement. Therefore, the output volume can't be controlled precisely. Moreover, as the grease therein is subject to prolonged pressure, base oil in the grease is forced to released, and hence the viscosity and hardness of the grease increase, and there is an increasing resistance to cause change on the spring compression. Then, it is hard to control output volume, and it is even impossible to force the grease to displace out of the cup. Use of this automatic grease cup can't solve the defects in the conventional grease gun.

SUMMARY OF THE INVENTION

The main object of the present invention is to provide an automatic grease dispenser using a motor to drive a rotary shaft via a reduction gear set for displacing a pusher downward to squeezing a grease out of a grease pack through an outlet at constant intervals. There is a positioning element inserted to an longitudinal groove on a piston rod of the pusher to prevent from rotation of the pusher following rotation of the rotary shaft. A timer circuit is used to control the motor for greasing in constant quantity at fixed intervals.

DETAILED DESCRIPTION OF THE PREFERRED EMBODIMENTS

Figure 1:
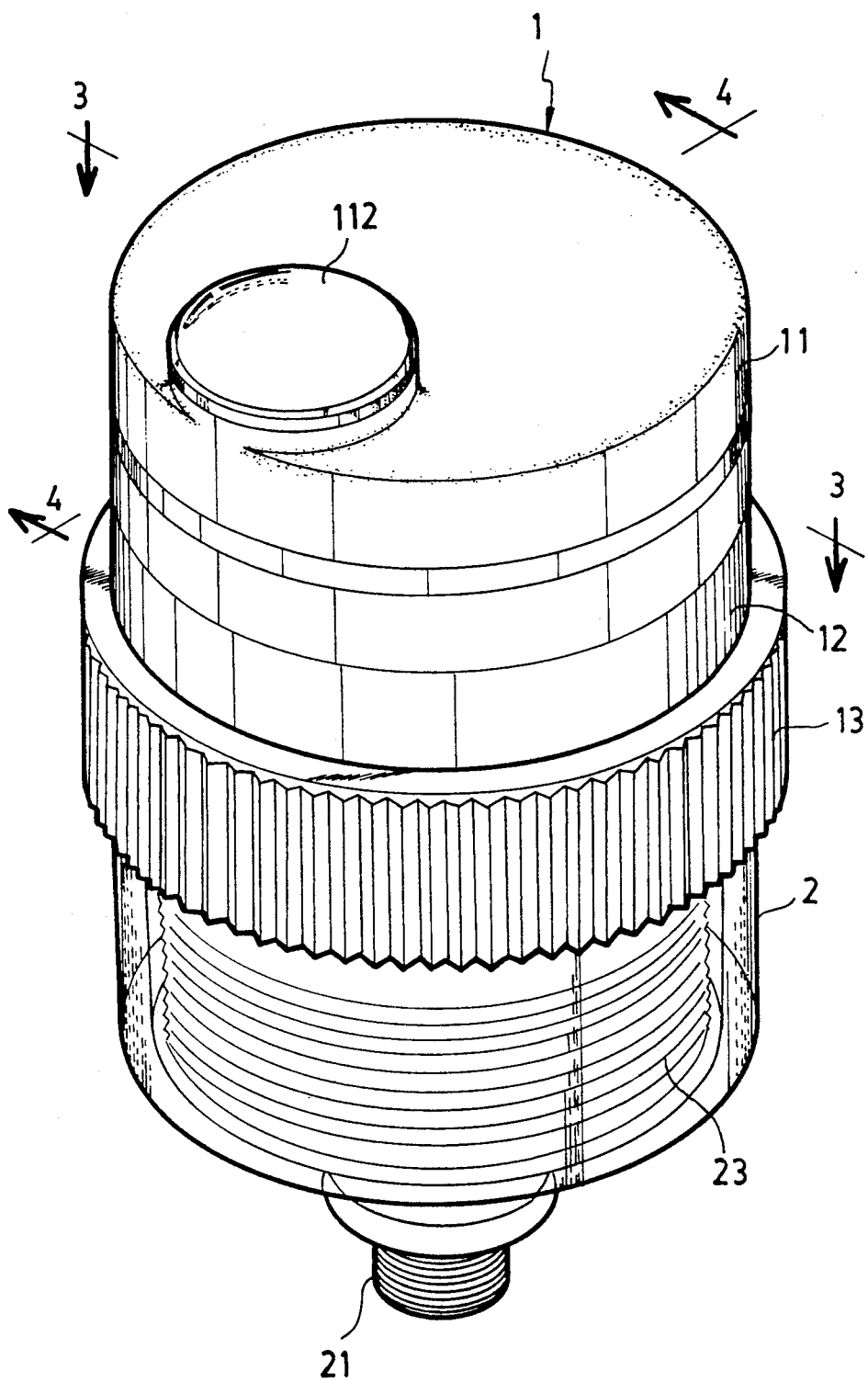
FIG. 1 is a perspective view of an automatic grease dispenser according to the present invention.
Figure 4:
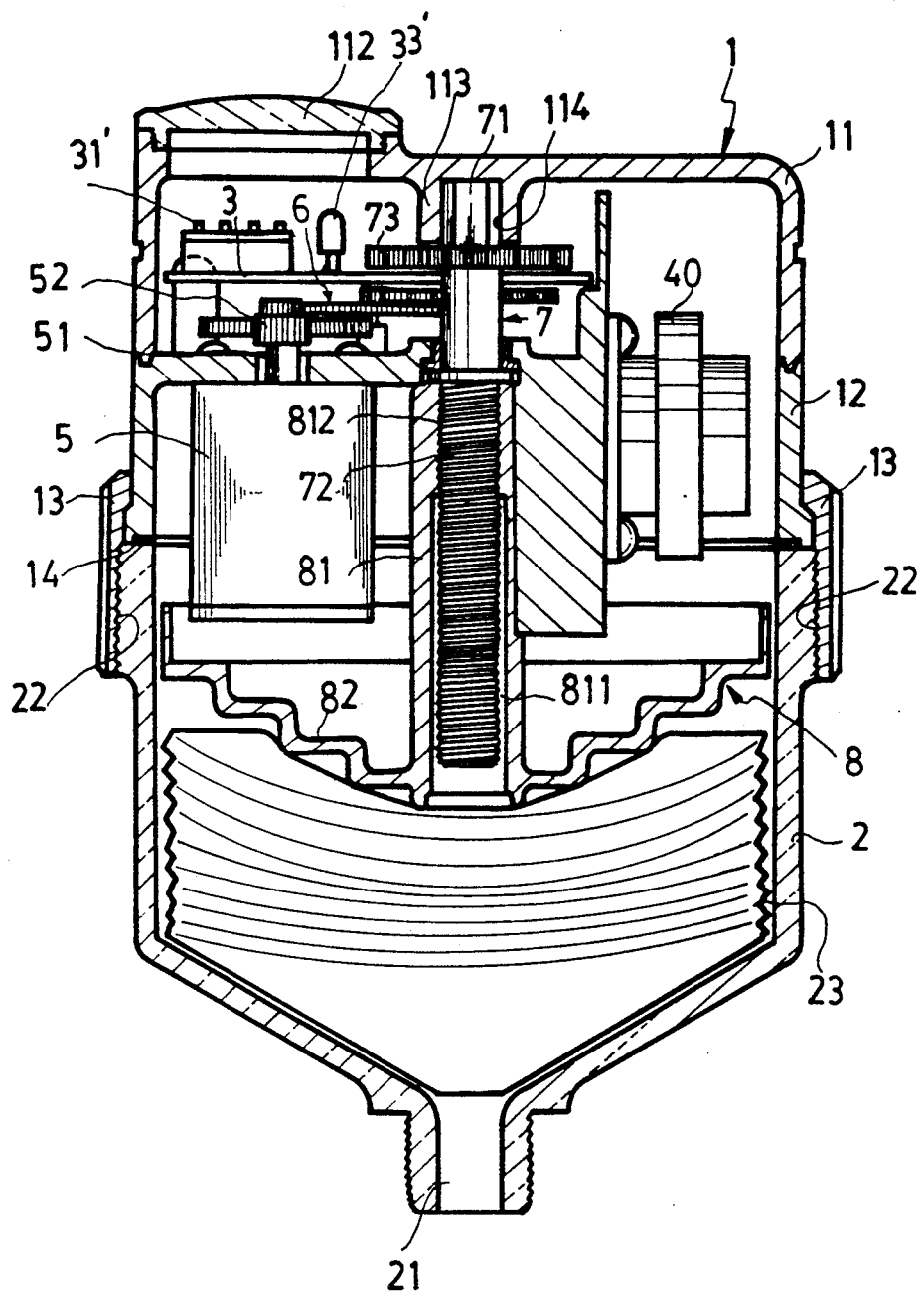
FIG. 4 is a cross-sectional view taken along line 4—4 of FIG. 1 looking in the director of arrows.
Figure 6:
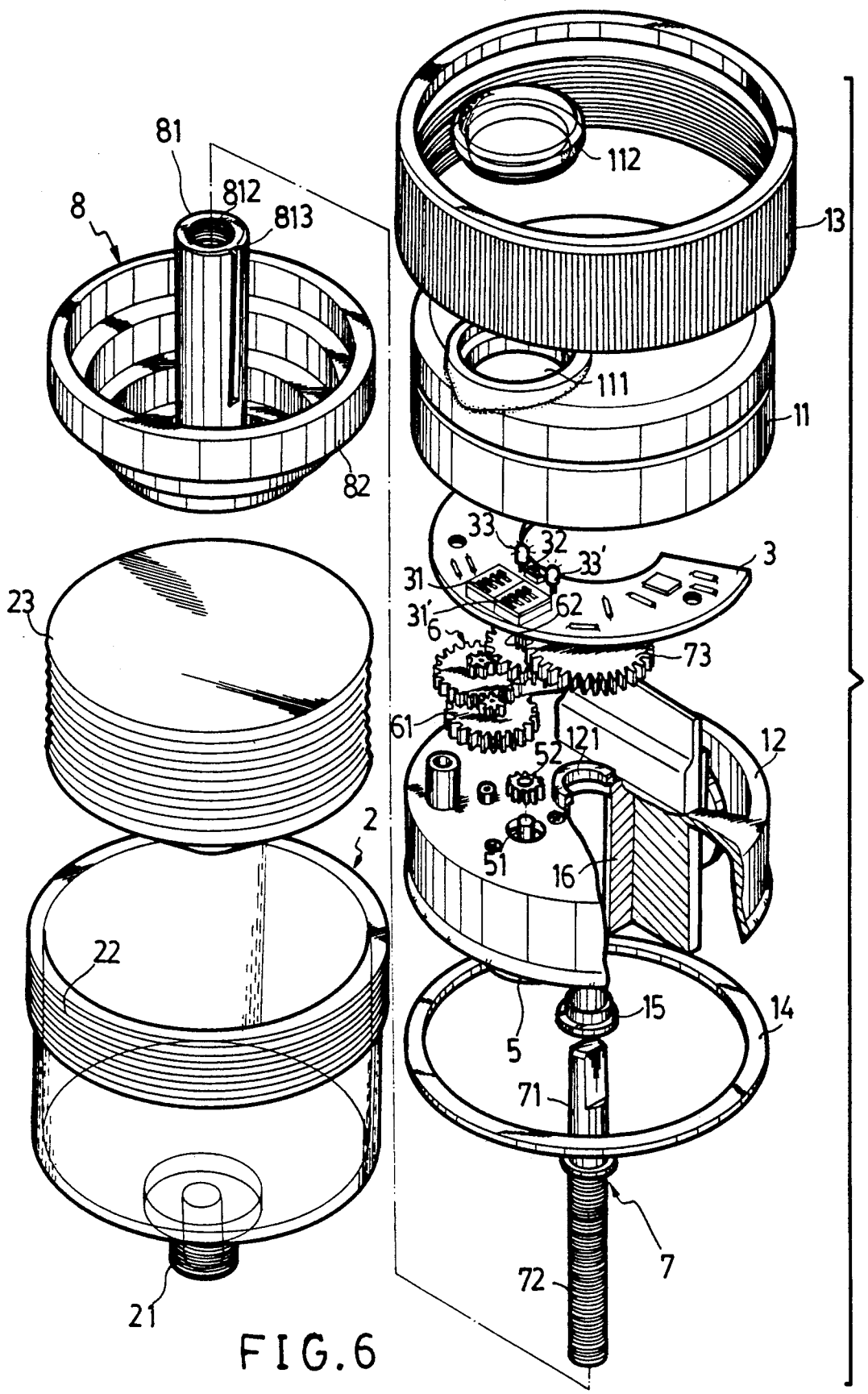
FIG. 6 is a fragmented view of the automatic grease dispenser in FIG. 1.

Please refer to FIGS. 1, 4 and 6, the automatic grease dispenser according to the present invention comprises a body (1) and a base (2). The body (1) contains a circuit board (3), a current transformer (40), a motor (5), a reduction gear set (6), a rotary shaft (7) and a pusher (8). The base (2) is for holding of a grease pack (23) and has an outlet (21) for grease from the grease pack (23). The base (2) is made of transparent material to facilitate viewing for remaining grease in the grease pack (23).

The base (2) is designed with an outer thread (22) on the top for connecting to the body (1) by means of a nut (13). The base (2) can be removed from the body (1) by loosening the nut (13) for replacement of the grease pack (23). A gasket (14) is placed between the base (2) and the body (1) to assure tight connection.

Figure 2:
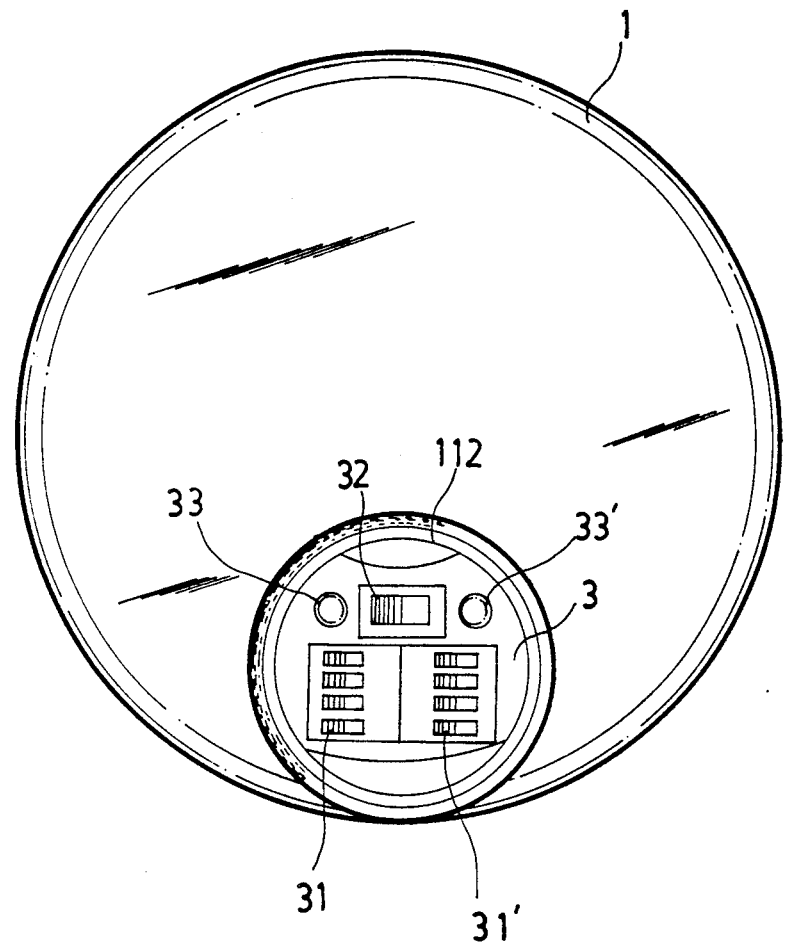
FIG. 2 is a top view of the automatic grease dispenser according to the present invention.

The body (1) has a hollow hole (111) on the top. A viewing glass (112) is formed with a thread for fixing to the hollow hole (111). The viewing glass (112) can be removed by turning. As shown in FIG. 2, the circuit board (3) is located beneath the viewing glass (112), and has two rows of dip switches (31 and 31'), in which the dip switch (31) is for adjustment of operating period of the motor (5) to control grease output, and the other dip switch (31') is to control intermittent working cycle of the motor (5) for intermittent oiling. A switch (32) is placed beside the dip switches (31 and 31') to drive the motor (5) for reverse operation when the grease pack (23) is exhausted for resetting of the pusher (8). Two LEDs (33 and 33') are used to indicate exhaustion of the grease pack (23) and normal operation of the grease dispenser respectively.

Figure 7:
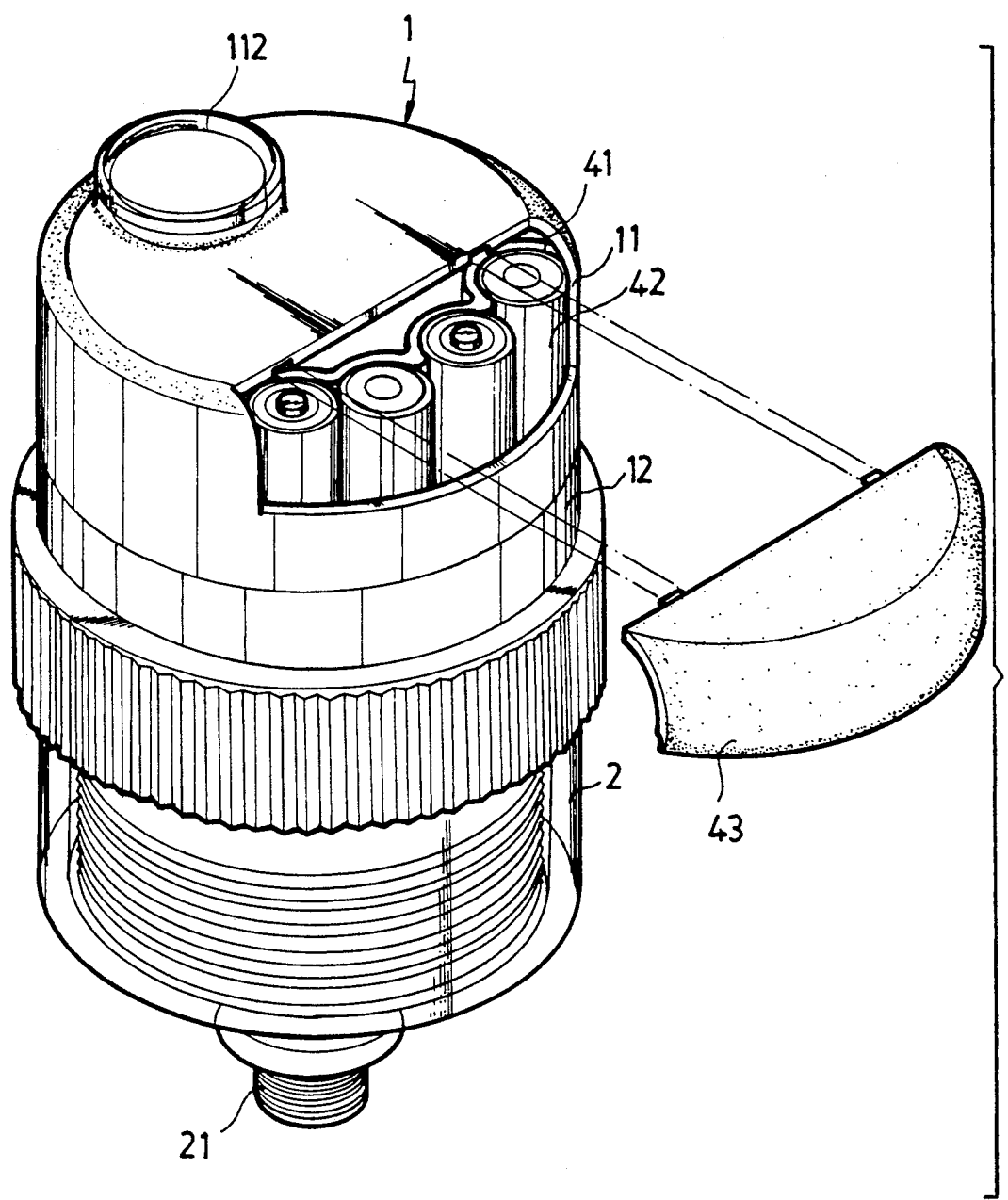
FIG. 7 is another embodiment of the present invention with batteries as power source.

As shown in FIGS. 4 and 7, there are two alternatives for power source to the motor (5) — AC power source with a current transformer (40) installed within the body (1) as shown in FIG. 4; or DC power source by installation of a plurality of dry batteries (42) in a battery chamber (41) designed within the body (1) as shown in FIG. 7. A battery chamber cover (43) is particularly designed to ease replacement of the batteries (42).

Figure 3:
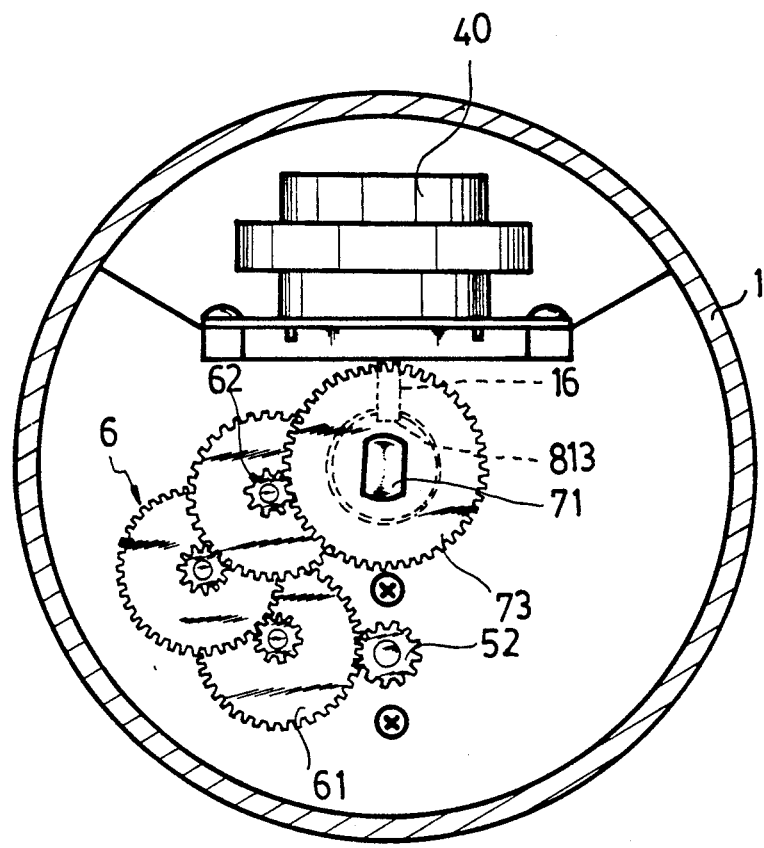
FIG. 3 is a cross-sectional view taken along line 3—3 of FIG. 1 looking in the direction of arrows.

Please refer to FIGS. 3, 4 and 6, the motor (5) is fixed at the lower body section (12), and has an output shaft

(51) engaging with an output gear (52). The output gear (52) is engaged with the first gear (61) of the reduction gear set (6). The rotary shaft (7) is formed with a shank (71) at the upper end and a threaded section (72) at the lower end. The shank (71) is connected to a transmission gear (73) engaged with the last gear (62) of the reduction gear set (6). A sleeve (15) is placed between the shank (71) and the lower body section (12) to ease rotation of the rotary shaft (7). The upper end of the shank (71) is placed in the bottom of the upper body section (11).

A hole (114) is designed with a flange (113) to prevent from swinging of the rotary shaft (7). The upper body section (11) and the lower body section (12) are formed as to separate parts to facilitate assembly of components in the body (1), and are joined together by supersonic welding to form the body (1) after assembly.

The pusher (8) comprises a piston (82) and a piston rod (81). The piston (82) has an outer diameter slightly smaller than the inner diameter of the base (2) to facilitate vertical displacement of the pusher (8) in the base (2), and to permit convection of air therein. The piston (82) is designed with a concentric stepped head to squeeze the grease pack (23) for an optimum pressure concentration to result the best output. The piston rod (81) is extended upward from the piston (82), and has an axial hole (811). The axial hole (811) has a smaller diameter and an inner thread (812) at the upper end for connecting to the threaded section (72) of the said rotary shaft (7). The piston rod (81) has a longitudinal groove (813) for insertion of a positioning element (16) extended from the lower body section (12) to prevent from rotation of the pusher (8) following the rotation of the rotary shaft (7).

Figure 5:
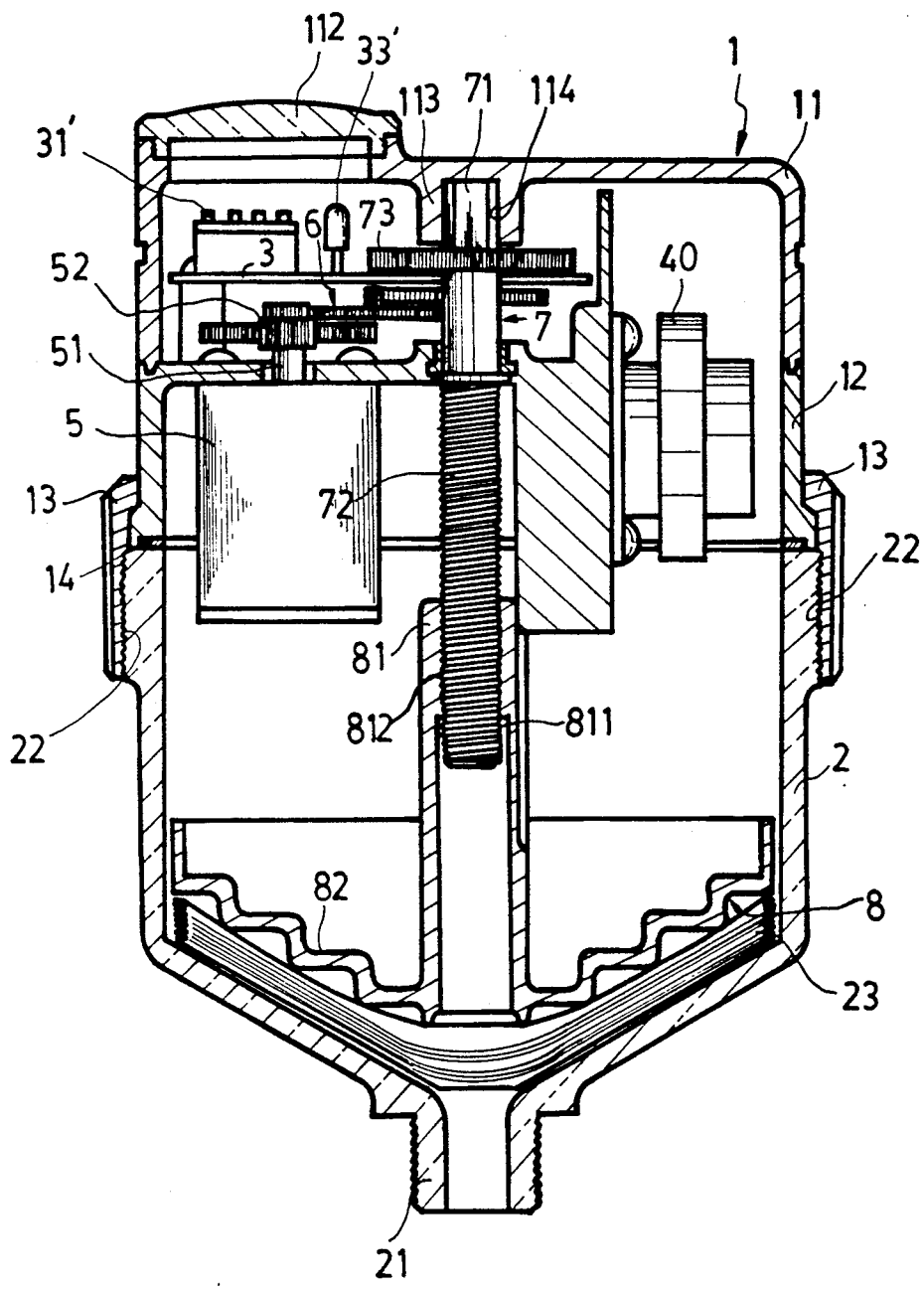
FIG. 5 is a cross-sectional view illustrating the automatic grease dispenser after an operation shown in FIG. 4.

As shown in FIGS. 4 and 5, when the motor (5) is running, it, after reduction by the reduction gear set (6), drives the rotary shaft (7) and then the pusher (8) to displace downward to squeeze the grease pack (23) so that grease in the grease pack (23) is squeezed out of the outlet (21).

Figure 8:
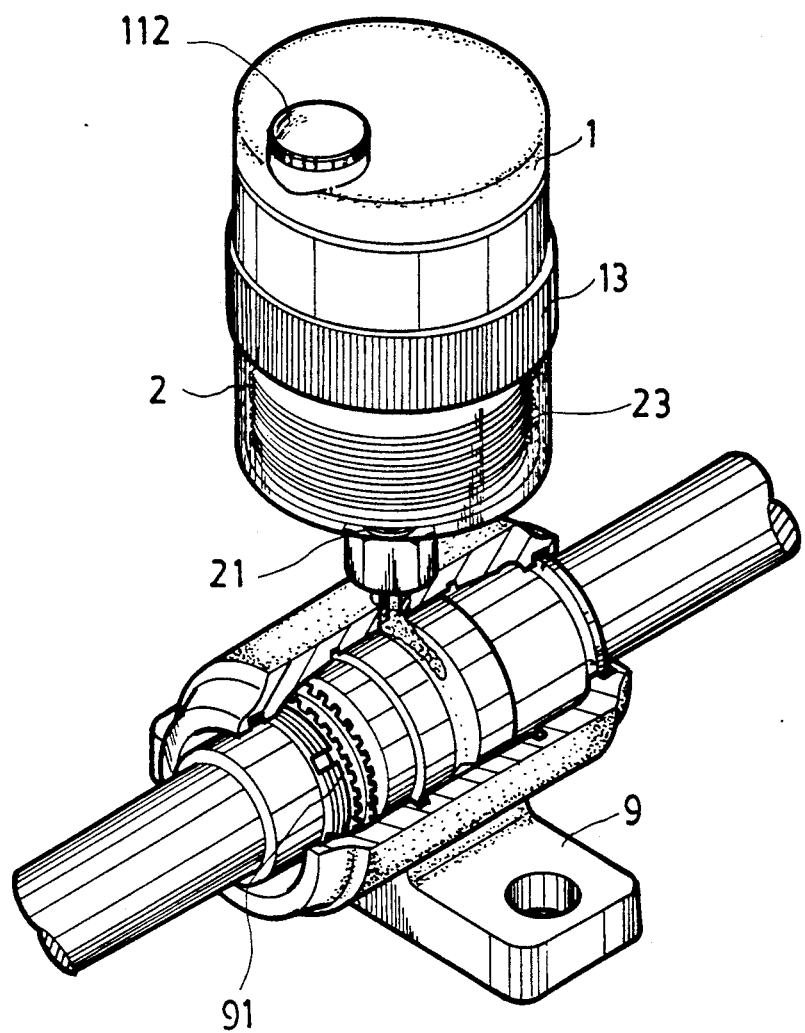
FIG. 8 illustrates application of the present invention in greasing of bearing.

FIG. 8 illustrates an application of the automatic grease dispenser according to the present invention. The outlet (21) is locked by means of thread to an oiling port of a bearing base (9) to lubricate a bearing (91) intermittently in a constant quantity periodically. This automatic grease dispenser can be used for any machine requiring lubrication with grease.

For use of the automatic grease dispenser according to the present invention, a grease pack (23) is placed in the base (2) first, and then the motor (5) is adjusted for intermittent operating cycle as shown in FIG. 2 for output of grease in constant quantity and at constant interval. When the grease pack (23) is exhausted, the switch (32) is turned on to run the motor (5) in reverse direction for displacing the pusher (8) upward and resetting of the pusher (8), and then the base (2) can be removed from the body (1) for replacement of the grease pack (23). After replacement of the grease pack (23), the base (2) is fixed to the body (1) to resume operation.

Apparently, the present invention can eliminate the conventional grease dispenser's defects, as follows:

(1) It can control grease output precisely: Two rows of dip switches are used to set up intermittent operating cycle and output period for constant output at constant intervals, and eliminate the defect of inaccurate output volume as happened in the conventional grease dispenser; and (2) It eliminates accumulation of pressure that deteriorate grease quantity: The present invention applies a pressure to the grease only during it is working to force out the grease, and no pressure is applied to the grease when there is no output from the present invention. Therefore, after prolonged operation, base oil in the grease will not be forced out and the grease will not be hardened. It is a design to prevent from deterioration of grease quality due to prolonged pressure applied to the grease by compression spring.

Hence, the present invention is an innovative means to eliminate the defects of the conventional grease dispenser.

I claim:

1. An automatic grease dispenser comprising mainly a body containing a circuit board and a current transformer or a set of batteries;

a base made of transparent material threaded to the bottom of the body for holding of a grease pack, and having an grease outlet at the lower side;

a motor with an output shaft engaging with an output gear;

a reduction gear set having a first and last gear the first gear engaging with said output gear;

a rotary shaft having an upper and lower end with a shank at the upper end connect to a transmission gear engaging with the last gear of the reduction gear set, and a threaded section at the lower end; and a pusher composed of a piston and a piston rod, in which the piston rod is extended upward from the center of the piston and having an axial hole with a upper section having inner thread for connecting to the threaded section of the said rotary shaft;

whereby grease can be squeezed out from the grease pack through the outlet intermittently in a constant quantity and at a constant interval set up at the circuit board by operation of the motor to drive the rotary shaft and then the pusher to squeeze the grease pack.

2. An automatic grease dispenser as claimed in claim 1 wherein the piston in the pusher has a longitudinal groove for insertion of a positioning element extended from the body to prevent from rotation of the pusher following rotation of the rotary shaft.

* * * * *